No Printed Specification Available
6279X
J. Knight,
Truss.
Patented Dec. 14, 1830.
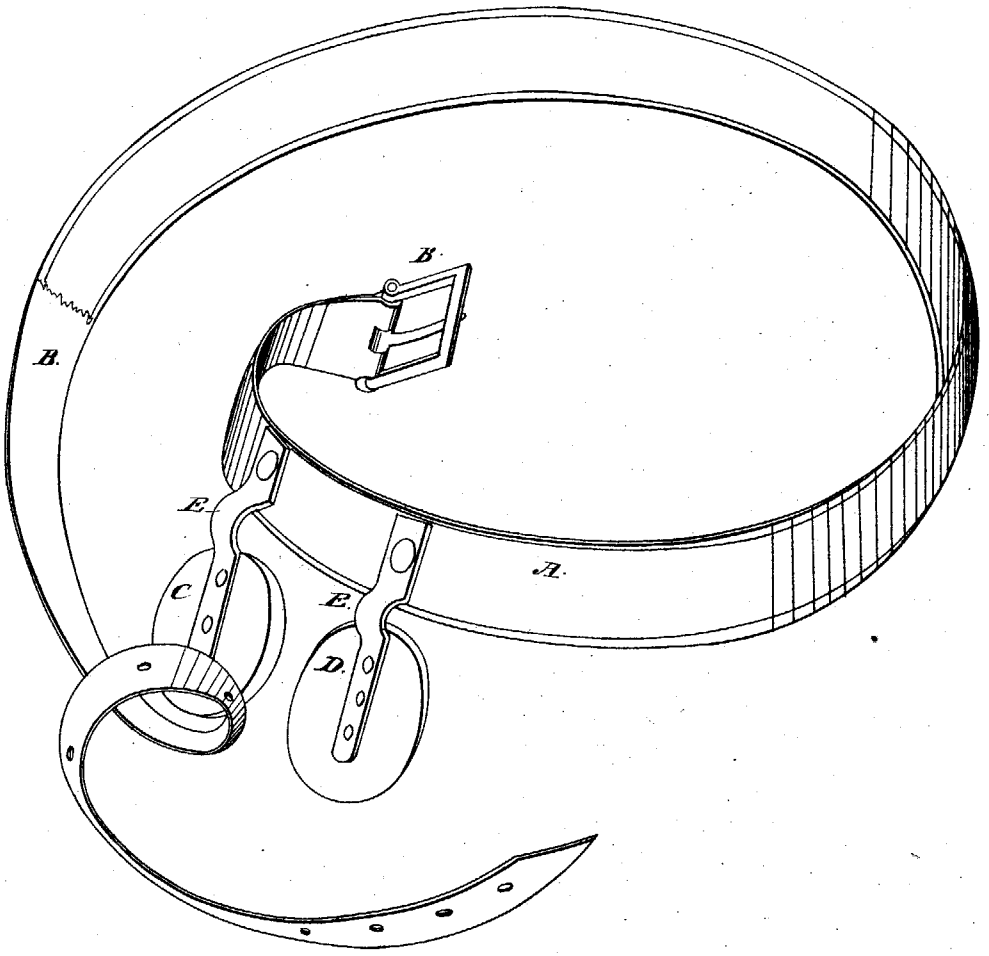
AM. PHOTO-LITHO. CO. N. Y. (OSBORNE'S PROCESS.)

James Knight, of Baltimore, Maryland

Letters Patent.

The Schedule referred to in these Letters Patent and making part of the same, containing description in the words of the said James Knight himself, of his improvement in Trusses.

To all to whom these presents shall come:

Be it known that I, James Knight of the City of Baltimore, in the County of Baltimore and State of Maryland have invented a new and useful improvement in trusses, and that the following is a full and exact description of the construction and operation of the said Machine as invented or improved by me.

I shall first give a description of Amos G. Hulls Patent hinge and pivot truss in order to point out clearly the nature of my improvement. The construction is as follows; Two concave pads are attached to an elastic steel spring by means of a hinge and pivot; this spring passes from one groin over the other and around to the spine where one of the pads is placed and the other in the groin over the rupture. This truss is attended with many disadvantages and inconveniences among which is the pressure on the spine in young people; this pressure which must necessarily be considerable in order to keep the instrument in its place, bears on certain points of the spine and on the rupture, and is frequently on its first application so painful as to be insupportable for more than a few hours at a time when the rupture is bad. The hinge and pivot in the centre allow the pad to have motion in every direction and in certain attitudes of the body the intestine may be intruded and great pain produced. In order to overcome this inconvenience he applies two of his springs, one on the other and even then the object cannot always be accomplished. I have endeavoured to overcome these difficulties and shall now give a description of my my truss; no pad is necessary upon the back; the pad over the
rupture is concave so as to correspond with the slight con-
vexity of the abdomen and is sustained over the rupture by
means of a small steel spring which is also curved to suit
the convexity of the abdomen and is rivited fast to the metallic
plate in the back of the pad; the other end of this spring is attached
to an elastic steel main spring by means of a rivet with a large head
which allows a lateral motion to the small spring. The main
spring is covered with leather and buckles around the hips when
it is fixed. In applying this truss the spring must be brought
round the body in the same manner as in the application of
A.G. Hulls truss, the small spring will form an angle with the main
spring and the pad will be in perfect coaptation with the hernial
parietes. as the end of the main spring which is above the rupture
extends a small distance from the abdomen, when the strap
is buckled perfectly tight the pad will press sufficiently to keep up
the intestine in the most difficult cases of hernia without pro-
ducing pain, and the pressure is by this means rendered equal
around the body; this circumstance is of great importance
in the treatment of hernia in labouring people and in infants
as the truss can be kept on with ease whilst they are in the recumbent
position. A.G. Hulls truss on the contrary cannot be worn while
the patient is lying down in consequence of the pain caused by the
pressure of the back pad on the spine. In my truss the pad is kept
in perfect coaptation with the hernial parietes under every pos-
sible inflection or attitude of the body by the elasticity of a
steel spring and not by a hinge and pivot as in A.G. Hulls
truss. This latter arrangement allowing of too much motion
whilst the elastic spring having a permanent situation yields
to all motions required but always maintains an equal pressure

What I claim as my invention and improvement in a truss
which is made to press equally around the body by means of an
additional spring and fixed concave pad; the pressure
being

X6279 being graduated by means of a strap and buckle by which the trusses is permanently fastened around the body making it different in principle from all other trusses; my truss can be worn, sitting, lying or standing with so little inconvenience as to be worn by the youngest infants 6 yd.

Witnesses
Caleb Jones M.D.
Wm Reid. M.D.

James Knight, M.D.

(8014 Words)

(Patented 14 December 1836)